(12) United States Patent
Knight et al.

(10) Patent No.: US 7,839,765 B2
(45) Date of Patent: Nov. 23, 2010

(54) ADVERTISING PORT STATE CHANGES IN A NETWORK

(75) Inventors: Frederick E Knight, Weare, NH (US); Jason M. Miller, Nashua, NH (US); Aaron D. Brooks, Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1014 days.

(21) Appl. No.: 10/957,707

(22) Filed: Oct. 5, 2004

(65) Prior Publication Data

US 2006/0072459 A1   Apr. 6, 2006

(51) Int. Cl.
*H04J 1/00* (2006.01)
(52) U.S. Cl. .......................... 370/218; 370/252
(58) Field of Classification Search ......... 370/216–228, 370/250, 252, 253
See application file for complete search history.

(56) References Cited

U.S. PATENT DOCUMENTS

| | | | |
|---|---|---|---|
| 6,381,218 B1 * | 4/2002 | McIntyre et al. ............ 370/216 |
| 2002/0167900 A1 * | 11/2002 | Mark et al. ................. 370/225 |
| 2003/0016624 A1 * | 1/2003 | Bare ......................... 370/217 |
| 2003/0120755 A1 * | 6/2003 | Fatica et al. ................ 709/220 |
| 2004/0151174 A1 * | 8/2004 | Del Signore et al. ........ 370/389 |
| 2005/0111378 A1 * | 5/2005 | Chen et al. ................. 370/252 |
| 2007/0201356 A1 * | 8/2007 | Liao et al. .................. 370/221 |

* cited by examiner

*Primary Examiner*—Ricky Ngo
*Assistant Examiner*—Pao Sinkantarakorn (57) ABSTRACT

In accordance with one embodiment of the present invention, a host bus adapter for implementing a first port of a node on a network of nodes interconnected through an intelligent connection system comprising: a transceiver providing a physical interface for the first port; and a protocol controller that transmits a notification to the intelligent connection system on behalf of a remote second port indicating that the second port may have failed when the second port fails to communicate with the first port.

31 Claims, 8 Drawing Sheets

| RSCN EVENT QUALIFIER | VALUE | | | |
|---|---|---|---|---|
| | BIT 5 | BIT 4 | BIT 3 | BIT 2 |
| 230A — EVENT IS NOT SPECIFIED | 0 | 0 | 0 | 0 |
| 230B — CHANGED NAME SERVER OBJECT - AN OBJECT MAINTAINED BY THE NAME SERVER HAS CHANGED STATE FOR THE PORT, AREA OR DOMAIN INDICATED BY AFFECTED PORT_ID. | 0 | 0 | 0 | 1 |
| 230C — CHANGED PORT ATTRIBUTE - AN INTERNAL STATE OF THE PORT SPECIFIED BY THE AFFECTED PORT_ID HAS CHANGED. THE CHANGE OF STATE IS IDENTIFIED IN A PROTOCOL SPECIFIC MANNER. | 0 | 0 | 1 | 0 |
| 230D — CHANGED SERVICE OBJECT - AN OBJECT MAINTAINED BY THE SERVICE IDENTIFIED BY THE WELL-KNOWN ADDRESS CONTAINED IN AFFECTED PORT_ID HAS CHANGED STATE. THIS EVENT QUALIFIER VALUE SHALL NOT BE USED BY SERVICE ACCESSED THROUGH N_PORT_ID THAT ARE NOT WELL-KNOWN ADDRESSES. | 0 | 0 | 1 | 1 |
| 230E — CHANGED SWITCH CONFIGURATION - SWITCH CONFIGURATION HAS CHANGED FOR THE AREA OR DOMAIN SPECIFIED BY THE AFFECTED PORT_ID. | 0 | 1 | 0 | 0 |
| RESERVED | ALL OTHER VALUES | | | |

ADVERTISING PORT STATE CHANGES IN A NETWORK

BACKGROUND

1. Field of Invention

The present invention relates generally to networks and, more particularly, to advertising port state changes in a network.

2. Related Art

A network typically includes a plurality of distributed and interconnected nodes such as computers, storage devices, and the like. Each node contains one or more ports through which the node is independently connected to the network. Each port manages communications with ports of other nodes on the network. Since a node may have multiple ports, typically there are multiple communication paths through the network between two particular nodes. If either a port or other portion of a communications path fails, another path between two communicating nodes may be established to maintain communications.

Some networks implement connection systems that intelligently route data over an optimal path through the network. Such intelligent connection systems maintain status and related information regarding ports, nodes, communication paths, and other network elements, and detect conditions that may interfere with communications over the network. Based on this information, intelligent connection systems select the optimal communications path over which data is exchanged between two ports.

Intelligent connection systems commonly available today include, for example, a Fibre Channel fabric controller, an iSCSI™-compatible switch (ISCSI is a registered trademark of One World Technologies, LLC), and an InfiniBand™ fabric controller (INFINIBAND is a trademark of the InfiniBand Trade Association). Intelligent connection systems obtain the above and other network information by detecting select conditions on the network, and by being provided other select information by ports on the network. For example, protocols implemented in the above and other networks require ports to notify the intelligent connection system each time the port experiences certain state changes. Other conditions of the network, some of which can impede communications, may not be detected by or reported to the intelligent connection system.

SUMMARY

In accordance with one embodiment of the present invention, a host bus adapter for implementing a first port of a node in a network of nodes interconnected through an intelligent connection system comprising: a transceiver providing a physical interface for the first port; and a protocol controller that transmits a notification to the intelligent connection system on behalf of a remote second port indicating that the second port may have failed when the second port fails to communicate with the first port.

In accordance with another embodiment of the present invention, a method for advertising port state changes in a network of nodes interconnected through an intelligent connection system comprising: detecting, by a first port, an interruption in communication with a second port; and transmitting from the first port to the intelligent connection system a notification of a port state change, wherein the notification identifies the second port as the source of the notification which has experienced the state change.

DETAILED DESCRIPTION

Embodiments of the present invention are directed to advertising remote port failures in a network implementing an intelligent connection system. Specifically, port failures which have not been previously addressed by the intelligent connection system may eventually be detected by another port in the network attempting to communicate or currently communicating with the failed port. The detecting port notifies the intelligent connection system of port failure on behalf of the failed port. In embodiments in which the implemented protocols permit ports to report their own and no other port's state or changes thereto, the detecting node masquerades as the changed port by transmitting to the intelligent connection system the state change information as it would be reported by the failed node. The intelligent connection system then notifies relevant other ports on the network that the failed port has experiences a state change. The notified ports individually utilize the port state change information. This eliminates unnecessary attempts by other ports to communicate with the failed port, and manage communications failures with the failed port, thereby reducing network traffic, and decreasing processing delays attributable to network communications, without having to modify pertinent existing network protocols.

Embodiments of the present invention may be used in any network implementing an intelligent connection system and associated protocols. Examples of such networks include a Fibre Channel network which implements a Fibre Channel fabric controller and related protocols, an iSCSI™ network that implements an iSCSI™-compatible switch and related protocols, and an InfiniBand™ network that implements an InfiniBand™ fabric controller and related protocols. One of ordinary skill in the art will appreciate that embodiments of the present invention can be implemented in other networks now or later developed which implement an intelligent connection system.

Exemplary embodiments of the present invention will be described in the context of one illustrative network introduced above, a Fibre Channel Network. The noted protocols implemented in such a network are collectively referred to as the Fibre Channel Standard. This integrated set of protocols pertain to networking, data storage and data transfer to facilitate high-speed transfer of large amounts of data. The Fibre Channel standard is promulgated by the FCIA (Fibre Channel Industry Association) which releases, through its Technical Committee T11, the Fibre Channel Protocol specifications.

Figure 1:
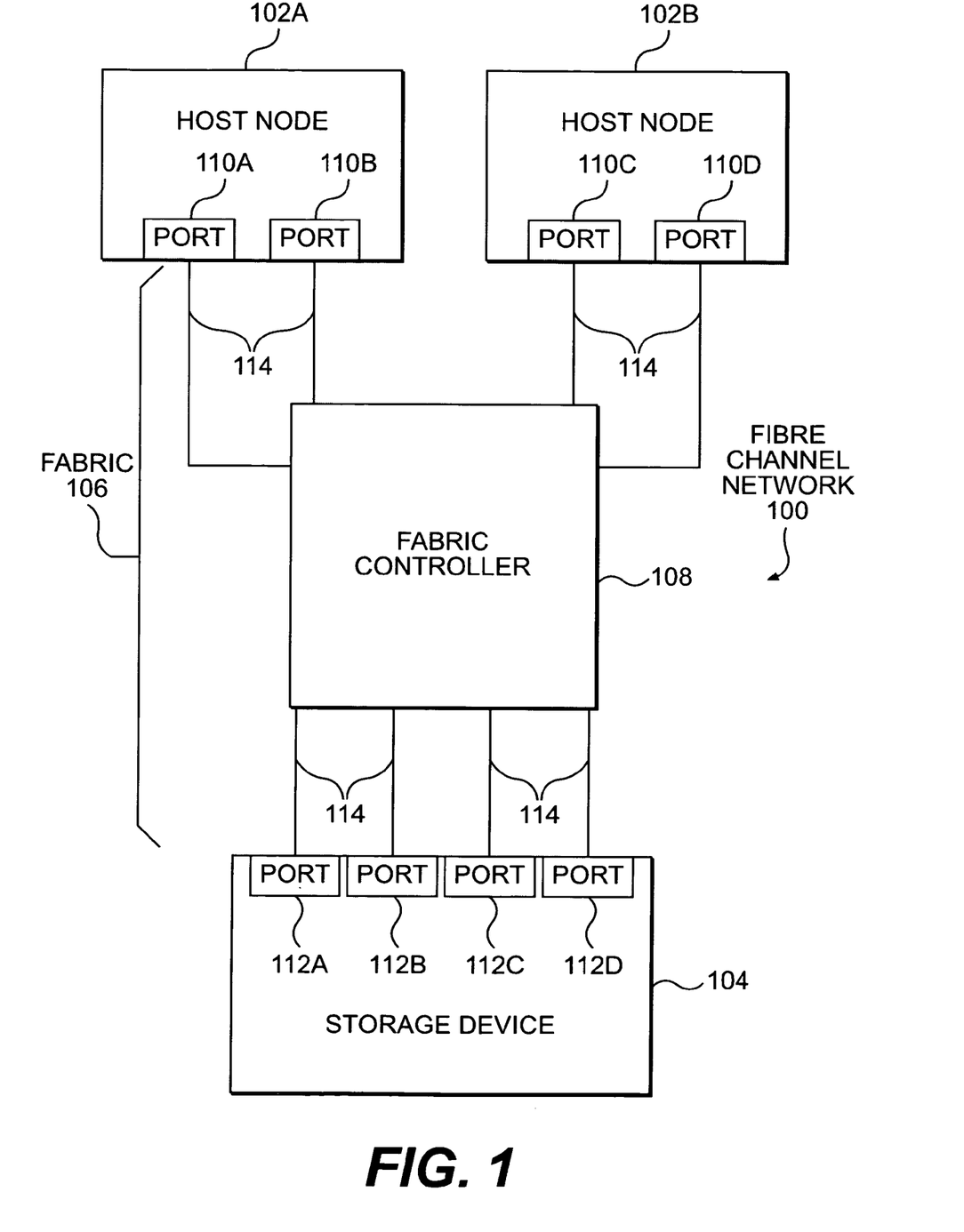
FIG. 1 is a high-level block diagram of an exemplary network implementing one embodiment of the present invention.

A high-level block diagram of an exemplary Fibre Channel Network 100 is illustrated in FIG. 1. Network 100 comprises a plurality of nodes including host server nodes 102A and 102B (collectively and generally referred to as host node(s) 102 or node(s) 102), and a storage device 104 (sometimes referred to herein as node 104.)

The interconnection between communicating nodes is generally referred to as a fabric in the Fibre Channel Standard, and communications on the fabric are controlled by a fabric controller. In FIG. 1, a fabric 106 comprises components that collectively route data exchanges between a host nodes 102, and storage device 104. These components include a physical layer such as fiber optic or copper lines 114, and a fabric controller 108. Fabric controller 108 implements an intelligent connection system that selects an optimal path through network 100.

Each node 102, 104 in network 100 is connected to network 100 via one or more ports 110, 112. For example, host server nodes 102 each comprise two ports 110 each separately connecting the associated host node 102 to fabric 106. Specifically host node 102A comprises ports 110A and 110B, and host node 102B comprises ports 110C and 100D. Similarly, in this example, storage device 104 comprises four (4) ports 112A-112D each separately connecting node 104 to fabric 106.

In this exemplary storage network, a typical data exchange begins with a port 110 on a host node 102 generating a data request command for a port 112 on storage device 104. Fabric controller 108 selects the communication path over which the command is sent to the identified port 112. An exchange transpires ultimately causing storage device 104 to store or retrieve data as requested, and return the appropriate reply to the initiating host port 110. As noted, this data exchange is managed by fabric controller 108 in accordance with the Fibre Channel Standard.

There may be several potential communication paths through fabric 106. In this simplified network 100, there are eight paths between each host node 102A, 102B and storage node 104. For host node 102A, the paths include the paths connecting port 110A to port 112A, port 110A to port 112B, port 110A to port 112C, port 110A to port 112D, port 110B to port 112A, port 110B to port 12B, port 110B to port 112C, and port 110B to port 112D. For host node 102B, the available communications paths include the paths connecting port 110C to port 112A, port 110C to port 112B, port 110C to port 112C, port 110C to port 112D, port 110D to port 112A, port 110D to port 112B, port 110D to port 112C, and port 110D to port 112D.

When a port 110, 112 experiences certain internal state changes defined by the Fibre Channel Standard, the changed port notifies fabric controller 108 that a state change has occurred. Fabric controller 108, in turn, notifies relevant other ports 110, 112 on the network. In accordance with the Fibre Channel Standard, such relevant ports are those ports which have registered with fabric controller 108 a request to receive notifications pertaining to a particular port 110, 112. When such relevant ports are notified of a port state change, they each determine how best to utilize such information, for example, selecting a port other than the changed port to communicate with the node having the changed port.

For example, if port 112A of storage device 104 experiences a change in its operational state, the port notifies fabric controller 108 that its internal state has changed. Fabric controller 108 thereafter notifies relevant ports of such a state change. In this example, both host server nodes 102 store and access data on storage device 104, and ports 110A-110D have at some previous time registered with fabric controller 108, to be made aware of the status of ports 112A-112D of node 104.

Accordingly, fabric controller 108 notifies ports 110A-110D that port 112A experienced an internal state change.

Thereafter, once the port state change is verified by port 110A, host commands sent by host node 102A from port 10A would be sent to another port 112B-112D in node 104. Similarly, once the port state change is verified by port 110B, host commands sent by from port 110B are sent to one of ports 112B-112D. Similar verification and port selection operations are also performed by each of nodes 110C and 110D. In other words, when port 112A reports an internal state change, all relevant nodes 110A-110D individually determine whether the state change warrants a change in port selection to communicate with node 104.

Figure 2A:
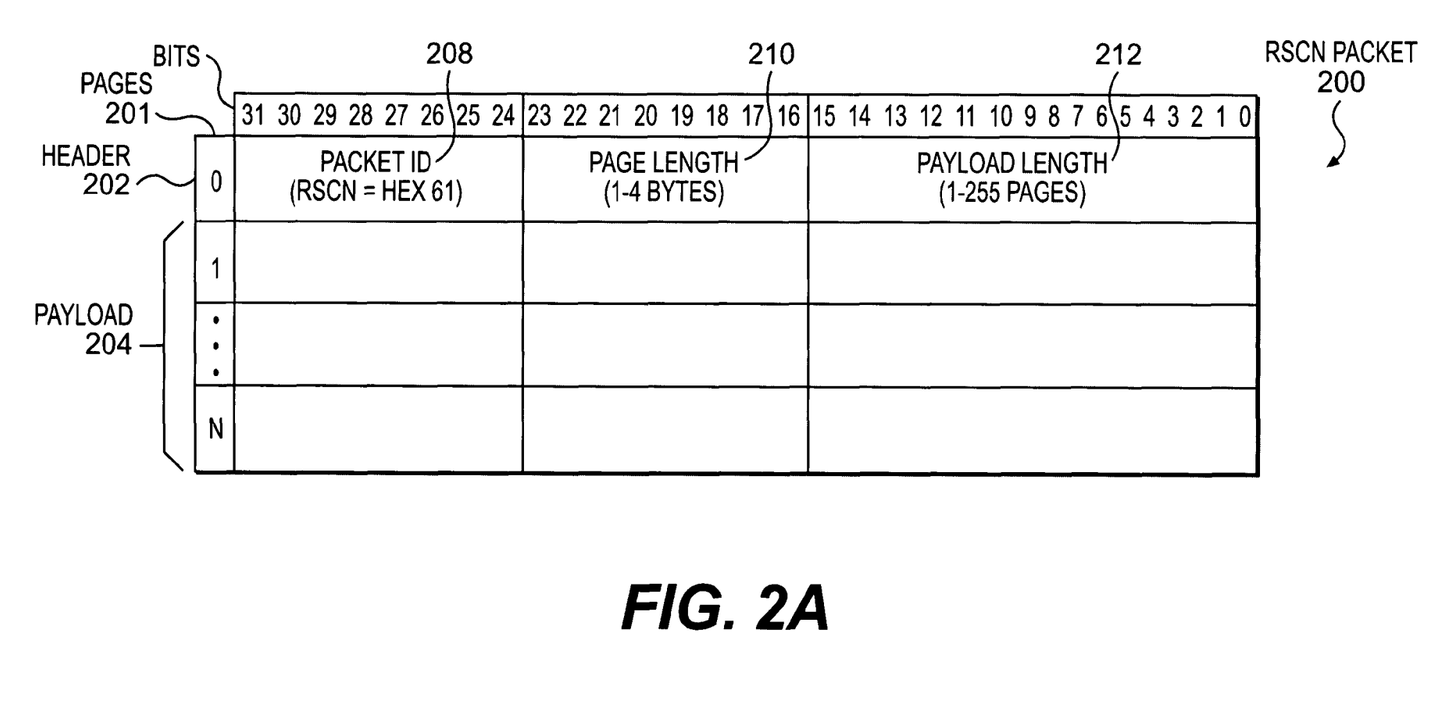
FIGS. 2A-2C are diagrams illustrating the format and contents of a Registered State Change Notification (RSCN) data packet as defined by the Fibre Channel Standard with which embodiments of the present invention may interact to advantage.
Figure 2B:
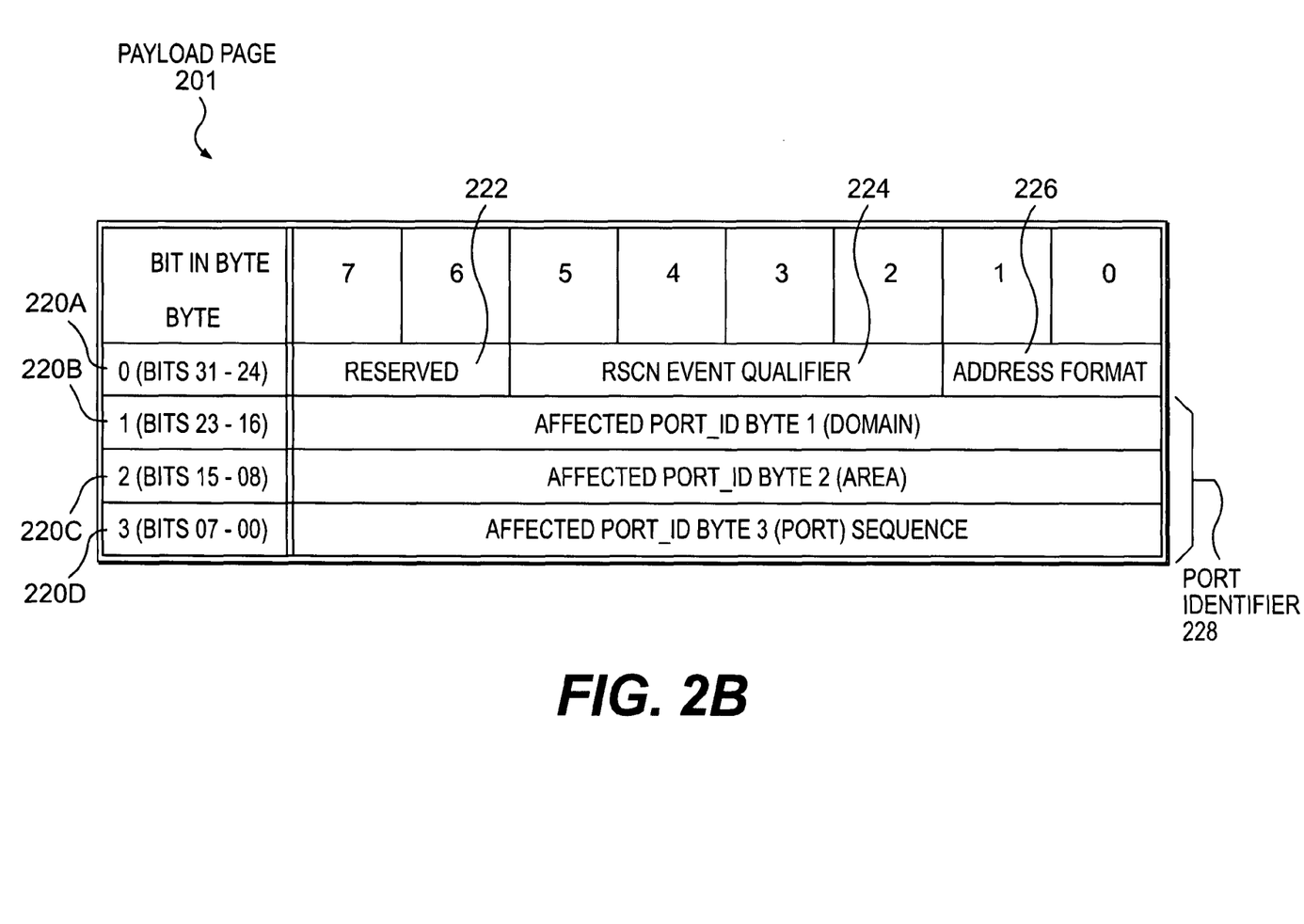
Figure 2C:
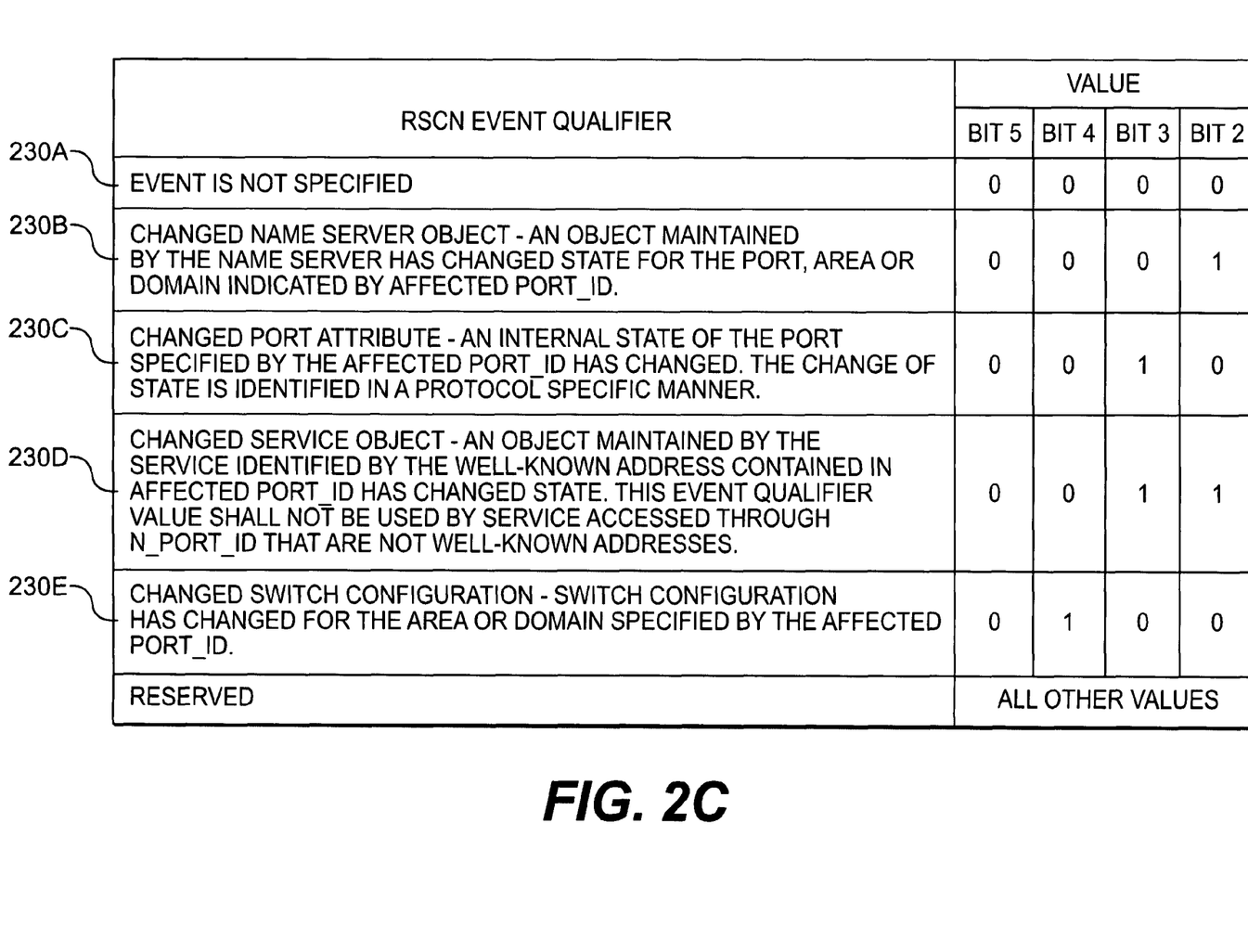

Data transmitted across Fibre Channel network 100 is generally divided into data packets the format of which is defined by the Fibre Channel Standard. One particular data packet is the data packet used to provide the above-noted notifications. In the Fibre Channel Standard, a "Request State Change Notification" (RSCN) data packet is used by ports 110, 112 to notify fabric controller 108 when that that port has experienced an internal state change. FIGS. 2A-2C illustrate the format and content of an RSCN packet as defined by the Fibre Channel Standard.

Referring to FIG. 2A, an RSCN data packet 200 comprises a plurality of pages 201. In this example, each page 201 is a 32-bit word. RSCN packet 200 includes a header page 202 followed by a payload 204 of one or more pages 201.

Header page 202 comprises a 16-bit payload length field 212 containing a value indicating the quantity of pages 201 in payload 204. A packet identification field 208 in also included in header page 202. Packet identification field 208 contains a value indicating that packet 200 is an RSCN packet. In accordance with the Fibre Channel Standard, this value is hexadecimal '61'. Header page 202 also comprises a page length field 210 containing a value indicating the number of bytes contained in each page 201. In this example, there are 32 bits, or 4 bytes, in each page 201.

FIG. 2B illustrates the format of a payload page 201. As noted, in this example, each payload page comprises four bytes, depicted in FIG. 2B as bytes 220A-220D. Byte 220A comprises an address format field 226 containing a 2-bit coded value indicating the format of the port identifier 228. In the format shown in FIG. 2B, address format 226 contains a value indicating port identifier 228 comprises three bytes 220B-220D. An RSCN event qualifier field 224 contains a value indicating the port identified in port identifier field 228 has experienced a state change. It should be appreciated that due to the large quantity of status information that may be reported by a port 110, 112, RSCN event qualifier field 224 identifies broad categories of changes that relevant ports may need be aware of. This is described in greater detail below with reference to FIG. 2C. Field 222 of byte 220A is reserved for future changes to the protocol.

Bytes 220B-220D comprise port identifier field 228 identifying the source of RSCN data packet 200 which, in accordance with the Fibre Channel Standard, is also referred to as the "affected port." Port identifier field 228 is a three-byte field with a byte 220B containing a value indicating the domain in network 100 in which the source port is located; a byte 220C containing a value indicating the area in the domain identified in byte 220B in which the source port is located; and a byte 220D containing a value indicating the address of the source port located in the area identified in byte 220C. As noted, when a port 110, 112 generates an RSCN data packet 200 to report an internal state change, the changed port inserts in bytes 220B-220D the requisite information to uniquely identify itself.

FIG. 2C is a chart depicting RSCN event qualifiers which may be identified in field 224 of a payload page 201. As shown in FIG. 2C, the Fibre Channel Standard identifies five (5) qualifying events 230A-230E. Each of the five currently defined event qualifiers is represented by a different binary representation in bits 5, 4, 3, and 2 of payload page 201, as shown in FIGS. 2B and 2C. Event 230A represents a category of events which are unknown by the initiator of the RSCN data packet 200. Event 230B is used to indicate the initiator of the RSCN packet 200 has detected a change to the name associated with an object, for example, a node name changing from "Server1" to "Server2."

Event 230C is used to indicate the initiator of the RSCN packet 200 is a port 110, 112 which has detected a change in its internal state. Event 230D is used to indicate the initiator of the RSCN packet 200 has detected a change to a service object. A service is a dedicated connection between one or more ports 110, 112, with possible differences in operation from normal communications. If the service is generic, i.e. accessed through a well-known port address, this sequence may be used. An example of a generic service is a name server. Event 230E is used to indicate a change to a switch on the network has been detected by the initiator of the RSCN packet 200. A switch is a device communicatively coupled to at least one network that routes data packets through one or multiple networks. All values for an RSCN event qualifier field 224 that are not specified are reserved for future protocol changes.

In accordance with the Fibre Channel Standard, when a port 110, 112 experiences a state change, it sends to fabric controller 108 an RSCN data packet 200 containing its port identifier in field 228 and the RSCN event value 0010 in field 224. Fabric controller 108 sends the same RSCN data packet 200 to all registered ports 110A-110D on network 100.

However, there are state changes that may occur in a port which prevent the port from communicating ("failures" herein) and which are not detected by that port. Such port failures, therefore, cannot be reported to fabric controller 108. Some such port failures are also not reflected in conditions monitored by fabric controller 108. Fabric controller 108, then, can not address such port failures, leaving them to be addressed by each other port on the network. One example of an unaddressed port failure in a network 100 having a fiber optic physical layer 114 is a condition in which a component of a port fails in a way that causes lasers in the port to remain active. Another example is a bypass circuit of the port remains engaged. Because such port failures are undetected by either fabric controller 108 or the failed port, fabric controller 108 is unable to notify relevant ports 110A-110D of the port failure. Host ports 110A-110D will, therefore, continue to send commands to the failed port 112 to communicate with storage device 104.

As each host port 110 attempts to communicate with the failed port 112 of storage device 104, the initiating host port 110 will not receive an acknowledgement to the initiated data exchange command. Eventually, such commands time-out in the initiating host port 110, causing the host port to perform a procedure to determine the cause of the failed acknowledgement. As one of ordinary skill in the art would appreciate, such procedures are defined by protocols other than those constituting the Fibre Channel Standard. In one example, the initiating host port 110 sends an abort command to target port 112A of storage device 104. When target port 112A fails to acknowledge the abort command, a second abort command is sent. When port 112A fails to acknowledge the second abort command, the initiating host port 110A performs a logout sequence.

Because the above process is performed for each initiating port 110A-110D, it may be performed up to four times in the above exemplary network 100. In typical networks having many host nodes each with many ports, the network traffic and the delay in host processing related to the management of unaddressed port failures can become significant.

In contrast, in accordance with the teachings of the present invention, a port failure which is unreported by the failed port and which has gone undetected by the intelligent connection system is advertised to relevant network ports once the failure is detected by another port on the network, thereby reducing or eliminating the traffic resulting from each notified port attempting to communicate with a failed port.

The operations of the present invention will now be described with reference to the high-level flow chart illustrated in FIG. 3. The operations will also be described with reference to the detailed flow chart illustrated in FIGS. 4A and 4B in the context of the above example in which a failure in port 112A has gone undetected by port 112A and fabric controller 108. In this example, port 110A of host node 102A initiates a data exchange with port 112A of storage device 104 subsequent to its failure.

Figure 3:
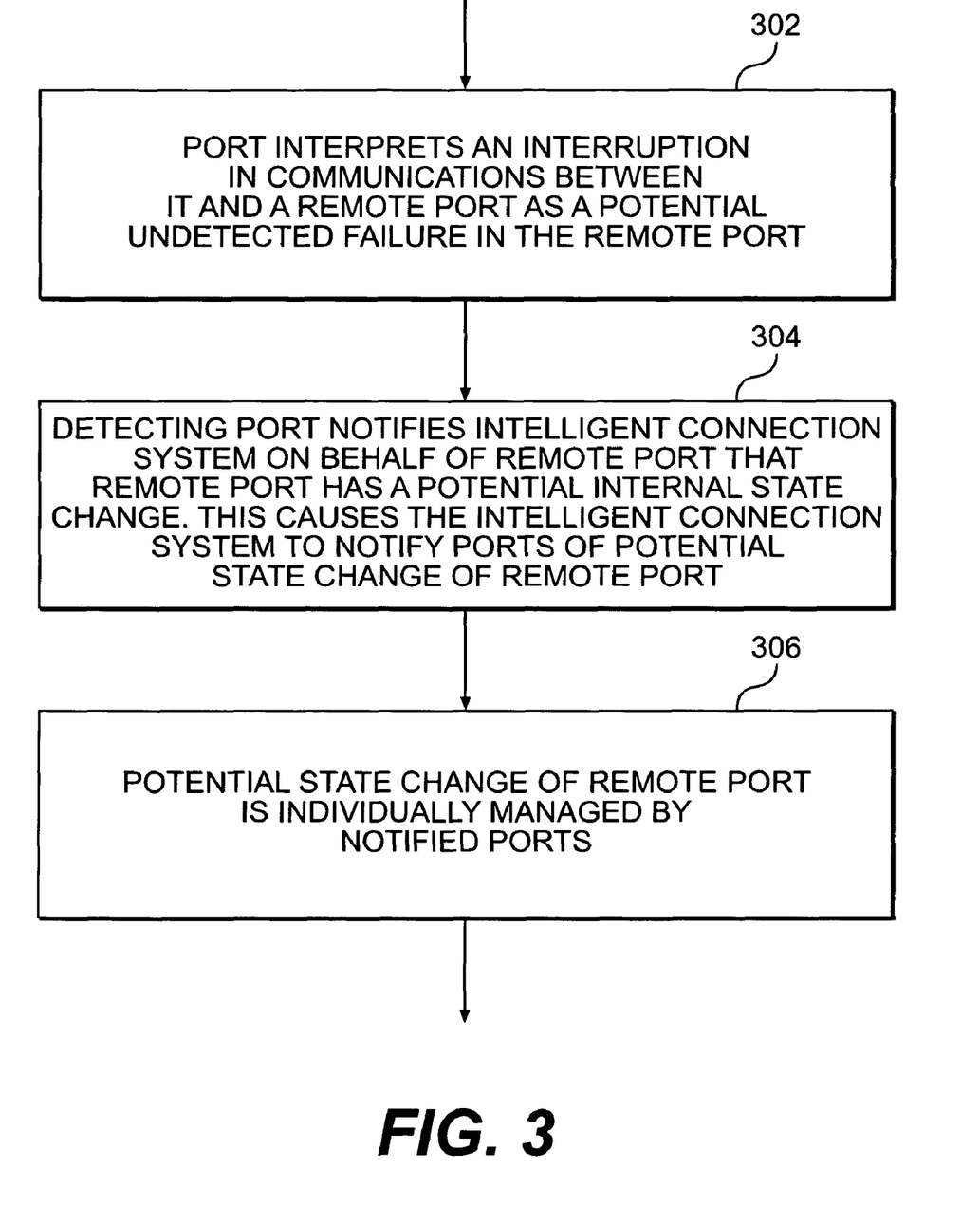
FIG. 3 is a high-level flow chart of the operations performed in one embodiment of the present invention.

Referring to FIG. 3, at block 302 a port experiences an interruption in communications between it and another remote port on the network. Such an interruption may occur when an initiating port does not receive a reply to an initial command sent to the remote port, or it may occur during a data exchange with the remote port. The port interprets such an interruption in communications as an indication that the remote port may have experienced a previously undetected failure. In the noted example, such a communications failure is experienced by initiating port 110A when the port fails to receive an acknowledgement from port 112A in reply a storage command previously sent to port 112A. Host port 110A considers the interruption in communication as a potential failure in port 112A that was not reported to fabric controller 108 by port 112A, or detected by fabric controller 108.

Figure 4A:
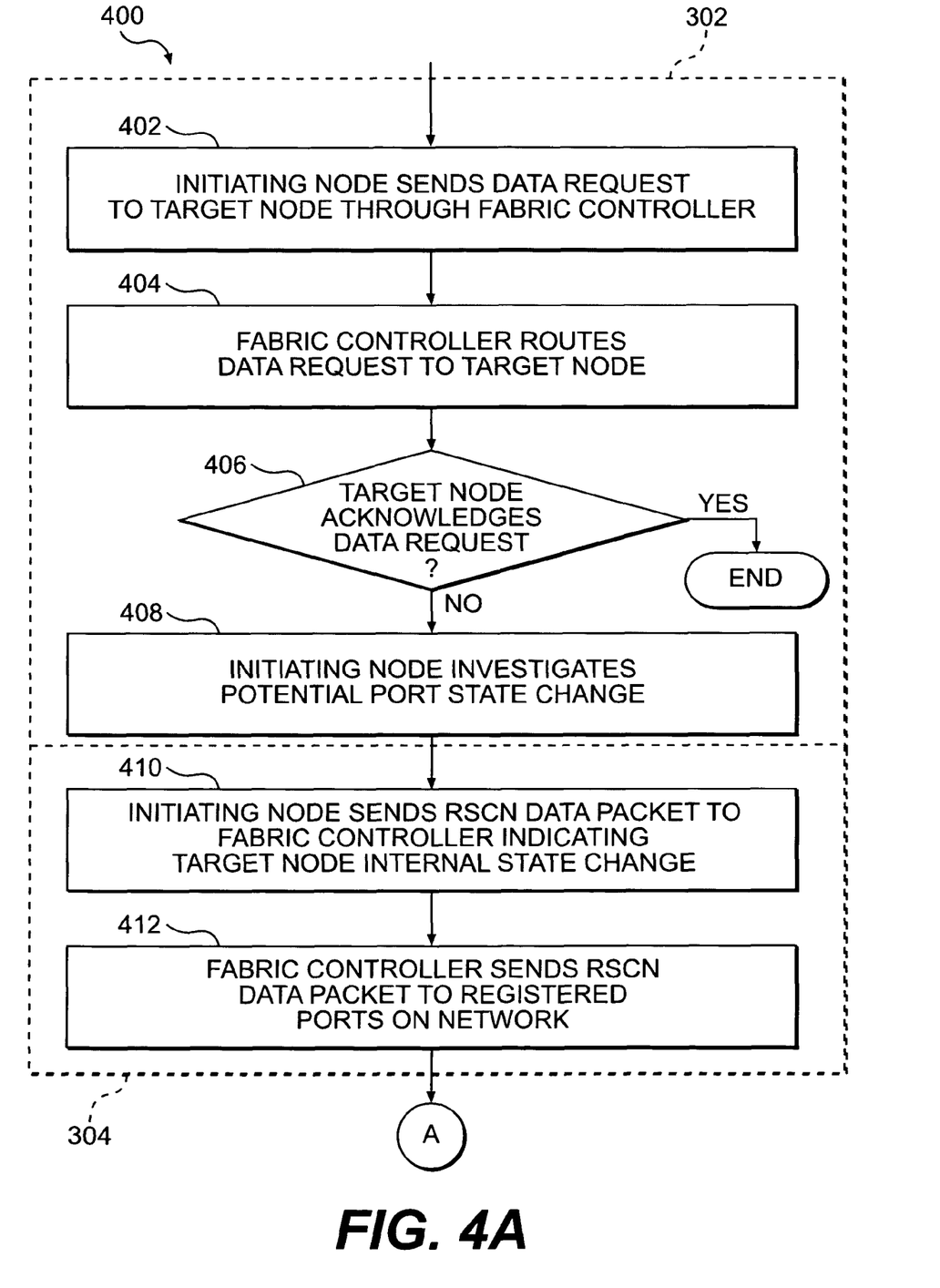
FIGS. 4A-4B are a detailed flow chart of the operations performed in one embodiment of the present invention.
Figure 4B:
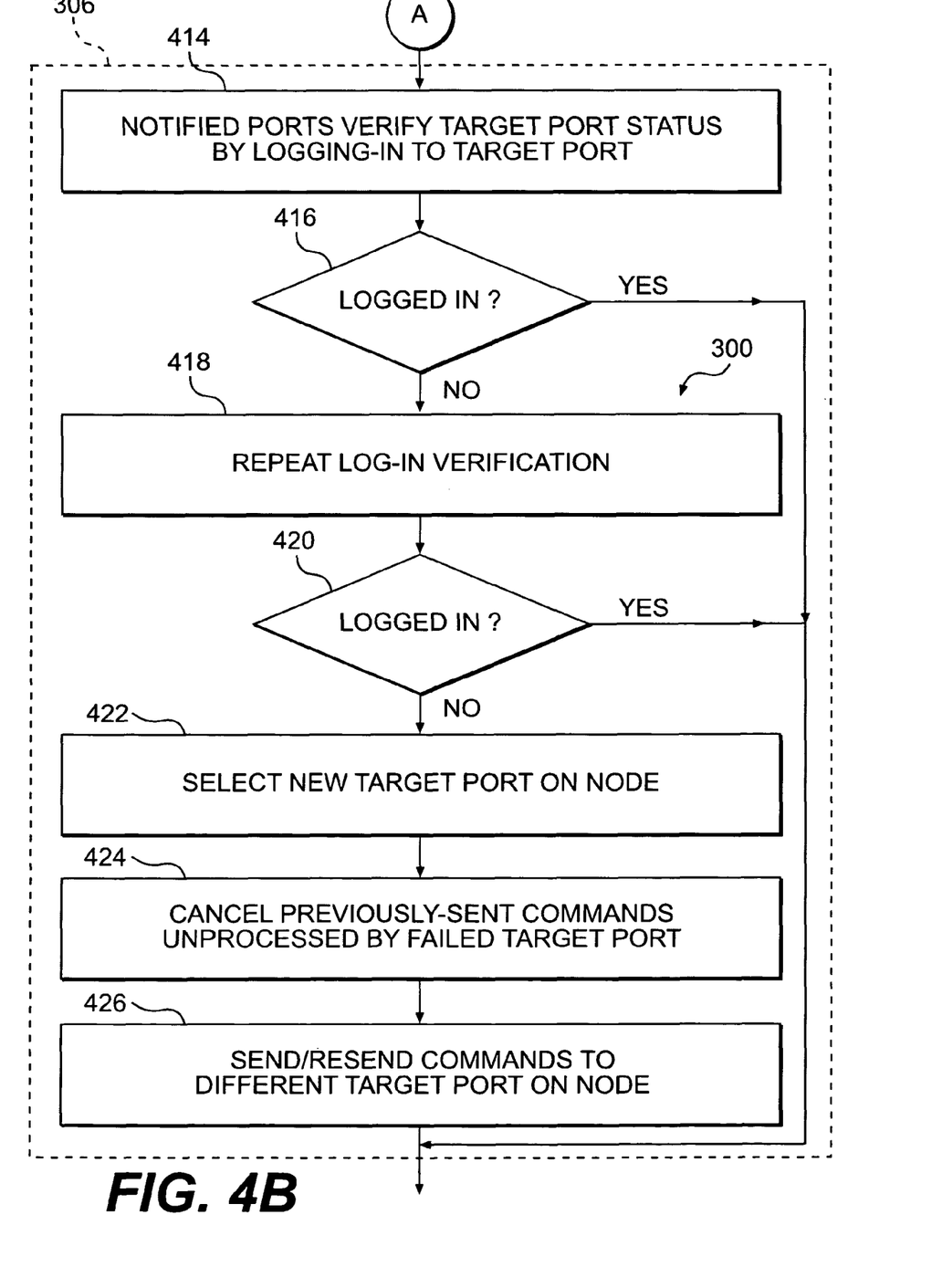

Referring to the embodiment shown in FIGS. 4A-4B, the above operations are shown in more detail at blocks 402-408. In this exemplary embodiment, at block 402, initiating port 110A sends a data request command to target port 112A through fabric controller 108. Fabric controller 108 routes the data request command to target port 112A at block 404. Initiating port 110A waits a predetermined time for an acknowledgement to be received from target node 112A, which is to be sent in accordance with the Fibre Channel Standard. Under normal conditions, target port 112A acknowledges receipt of the data exchange request command in accordance with the implemented protocol. If the target node 112A does acknowledge receipt at block 406, then the operations of process 400 end as shown in FIG. 4A. Otherwise, the acknowledgement is not issued by target node 112A, and upon passage of the predetermined time set to receive the acknowledgement, operations continue at optional block 408.

At block 408, initiating port 110A performs one or more optional operations permitted by the implemented protocols to determine whether the failure to receive an acknowledgement from target port 112A is due to a change in state in port 112A or due to other undetected conditions on the network 100. For example, the cause of the failed data exchange acknowledgement might be due to a processor loading issue or a communications error, rather than a failure which was previously undetected by fabric controller 108. However, as noted above with reference to FIGS. 2A-2C, the Fibre Channel Standard allows for an indication of only a state change to be distributed to relevant nodes on network 100; each port notified of such a state change is expected to manage that information independent of the Fibre Channel Standard. Accordingly, in the above example, host 110A does not perform the operations depicted at block 408 since the results of such an investigation could not be advertised to relevant nodes in Fibre Channel network 100.

Returning to FIG. 3, at block 304, the port that detected a potential failure in the remote port notifies the intelligent connection system on behalf of the remote port that the port may have experienced a state change. The intelligent connection system disseminates this information to other relevant ports on the network.

Referring to the embodiments illustrated in FIGS. 4A and 4B, the operations performed at block 304 are shown in more detail at blocks 410 and 412. Continuing with the above example, at block 410 host port 110A sends a Registered State Change Notification (RSCN) data packet 200 to fabric controller 108. In contrast to the Fibre Channel Standard, host port 110A inserts a value into port identifier field 228 (FIG. 2B) that identifies port 112A as the affected port. Host port 110A also inserts value of "0010" into RSCN event qualifier field 224 indicating the port identified in port identifier field 228, that is, the failed port 112A rather than port 110A, has experienced an internal state change. In other words, host port 110A sends a notification that would have been sent by the port that experienced the failure had the failed port been able to do so. Thus, by masquerading as changed port 112A, host port 110A provides fabric controller 108 with information regarding failed port 112A that it would not otherwise have received.

At block 412, fabric controller 108 notifies registered ports 110A-110D in network 100 that port 112A has experienced an internal state change by forwarding the same RSCN data packet 200 to the registered ports. Thus, fabric controller 108 notifies all relevant ports; that is, ports 110B-110D, that port 112A has experienced a state change. Because port 110A is registered along with ports 110B-110D as being one of the relevant ports pertaining to port 112A, fabric controller 108 notifies port 110A along with ports 110B-110D.

Returning to FIG. 3, at block 306, each port notified by the intelligent connection system manages the state change of the remote port in accordance with the specific protocols implemented in the network. If there are no current communications with the remote port, for example, then a notified port may decide to not contend with the potential state change when it receives the notification, but rather wait until the next communication with the node which has the changed port. Alternatively, a notified port may attempt to verify the potential state change upon receipt of the above notification.

Referring to the embodiment shown in FIGS. 4A and 4B, the operations performed at block 306 are shown in more detail at blocks 414 through 424. It should be understood that the following operations are independently performed by each notified node 110A-110D and in accordance with the implemented protocols. For ease of description, the following description will be presented in the context of initiating host node 110A.

At block 414 host port 110A investigates the state change indication by verifying it is logged into port 112A. If at block 416 host port 110A receives confirmation from target port 112A that host port 110A is logged in, then the prior interruption in communications was caused by something other than a undetected failure in target port 112A. Should target port 112A not respond to the login request, the request is repeated at block 418. If at block 420 target port 112A responds, then there was no failure in target port 112A. On the other hand, if target port 112A fails to respond to the second login request, then initiating host port 110A concludes that target port 112A has indeed experienced a previously undetected failure. At block 422 host port 110A selects a different port 112B-112D on storage device 104, say port 112C, for future communications.

At block 424, host port 110A cancels any previously-sent commands that were not processed by failed target port 112A. Any commands that were sent to failed port 112A and which were not responded to or otherwise processed will now be sent to the new target port 112C at block 426. All future communications with node 104 will go through the new target port 112C as well.

It should be appreciated that each port individually verifies the error through any means consistent with the implemented protocol. Accordingly, the operations depicted at blocks 414 through 424 represent just one exemplary implementation of the operations depicted at block 306. For example, in those embodiments in which the implemented protocols permit the dissemination of more detailed information regarding the status of the ports, then the detecting node 110A may determine at block 408 that the target port 112A has failed and provide that information to intelligent connection system (again, masquerading as the failed port). The intelligent connection system would forward such information to the relevant ports. In such an embodiment, a more abbreviated or no verification process may be performed at block 308.

Figure 5:
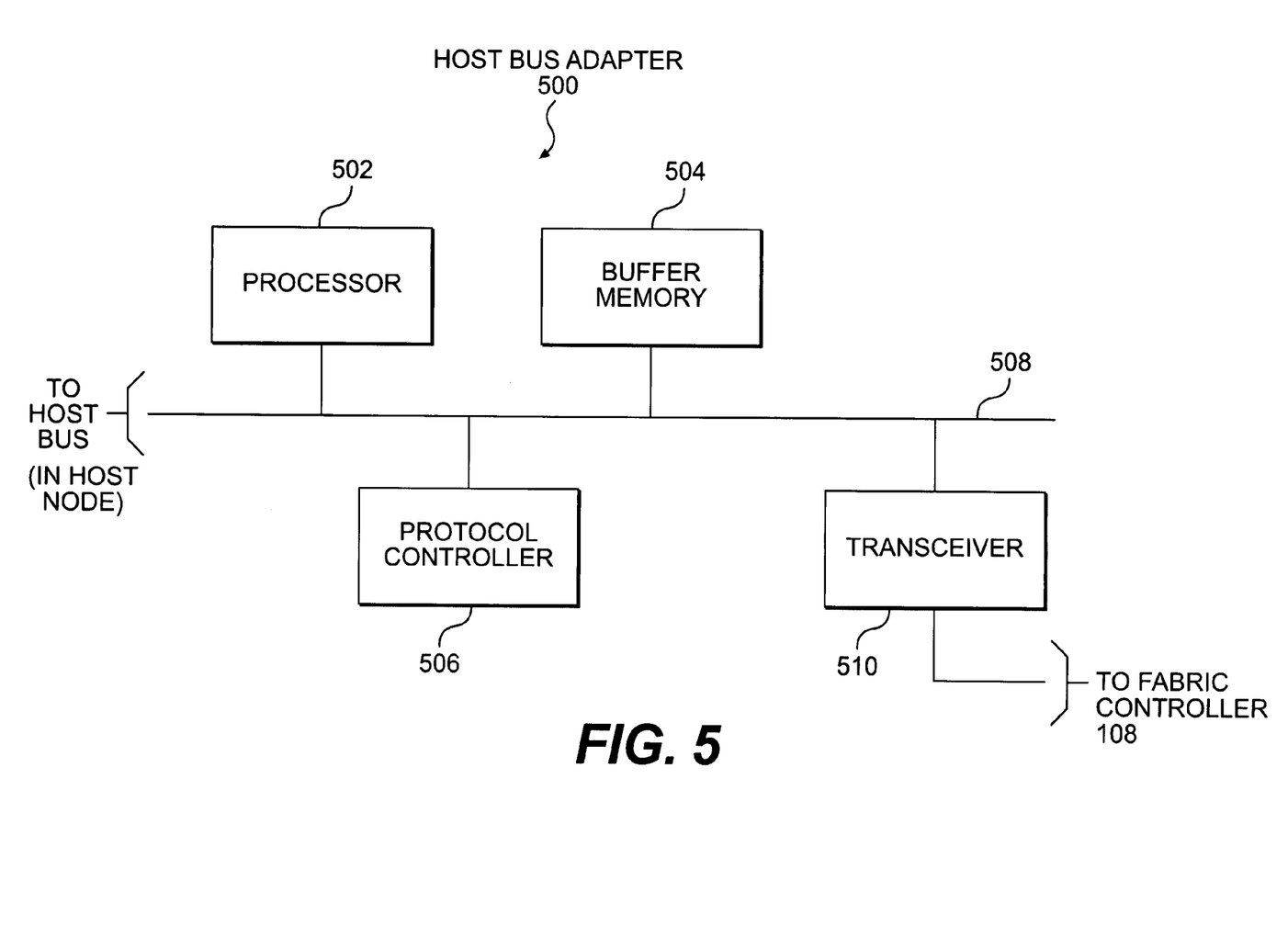
FIG. 5 is a functional block diagram of one embodiment of a host bus adapter implementing embodiments of the present invention.

Nodes 102, 104 communicate with fabric 106 using at least one translation device, such as a host bus adaptor. In a Fibre Channel Network such as network 100, a host node 102 most commonly uses a host bus adapter to connect to fabric 106. FIG. 5 is a functional block diagram of one embodiment of a host bus adapter 500. Host bus adapter 500 is operationally coupled to host nodes 102A, 102B to implement one of ports 110A-110D. Host bus adapter 500 is comprised of a processor 502, a protocol controller 506, a buffer memory 504, and a transceiver 510. Transceiver 510 transmits and receives data over a physical layer such as a fiber optic cable 114 in Fibre Channel network 100.

Processor 502 receives a storage command from host node 102. Processor 502 uses buffer memory 504 and protocol controller 506 to split the data into data packets compliant with the implemented protocol. Transceiver 510 sends the data packets to fabric controller 108 over fiber optic line 114. Protocol controller 506 implements embodiments of the present invention as described above. It should be appreciated by those of ordinary skill in the art that embodiments of the present invention may be implemented in other translation devices serving as a port 110 for a host node 102. For example, in alternative embodiments, the present invention is implemented in a bridge or gateway operationally coupled to a host node 102.

The above and other methods and operations of the present invention may be performed by one or more computer programs. The computer program(s) can exist in a variety of forms both active and inactive. For example, computer program(s) and/or objects embodying the invention can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

What is claimed is:

1. A host bus adapter for implementing a first port of a node in a network of nodes interconnected through an intelligent connection system, the host bus adapter comprising:

a transceiver providing a physical interface for the first port; and a protocol controller configured to transmit a notification to the intelligent connection system on behalf of a remote second port indicating that the second port has potentially failed when the second port fails to communicate with the first port, wherein transmission of the notification to the intelligent connection system is to cause the intelligent connection system to determine all other remote ports in communication with the second port and to notify the other remote ports of a state change at the second port, wherein the protocol controller is configured to attempt to communicate with only remote ports not previously determined to be inoperative by the protocol controller, wherein a determination that the remote ports are inoperative is made in response to one or more notifications from the intelligent connection system that the remote ports have experienced an internal state change.

2. The host bus adapter of claim 1, wherein the notification to the intelligent connection system identifies the second port as a source of the notification.

3. The host bus adapter of claim 1, wherein the notification reports the potential failure of the second port as an internal state change of the second port.

4. The host bus adapter of claim 1, wherein the intelligent connection system comprises one from a group consisting of:

a Fibre Channel fabric controller, and further wherein the network implements Fibre Channel Standard-compliant protocols;

an iSCSI-compatible switch, and further wherein the network implements iSCSI-compliant protocols; and an InfiniB and fabric controller, and further wherein the network implements InfiniBand-compliant protocols.

5. The host bus adapter of claim 1, wherein the notification to the intelligent connection system does not require modification to protocols implemented in the network.

6. The host bus adapter of claim 1, wherein the network is a Fibre Channel network, and further wherein the notification to the intelligent connection system comprises:

a Fibre Channel Request State Change Notification data packet comprising a port identifier field having a value identifying a source of the data packet as the second port; and an event field having a value identifying an internal state change has occurred in the identified port.

7. The host bus adapter of claim 1, wherein the network is a Fibre Channel network, and further wherein the second port fails to communicate with the first port due to at least one condition from a group consisting of:

a component of the second port fails such that lasers in the second port remain active; and a component of the second port fails such that a bypass circuit of the second port remains engaged.

8. A host bus adapter for implementing a first port of a node in a network of nodes interconnected through an intelligent connection system, the host bus adapter comprising:

a transceiver providing a physical interface for the first port; and a protocol controller configured to transmit a notification to the intelligent connection system on behalf of a remote second port indicating that the second port has potentially failed when the second port fails to communicate with the first port, wherein transmission of the notification to the intelligent connection system is to cause the intelligent connection system to determine all other remote ports in communication with the second port and to notify the other remote ports of a state change at the second port, wherein the notification reports the potential failure of the second port as an internal state change, and wherein, subsequent to notifying the intelligent connection system that the second port has potentially failed, the host bus adapter is configured to receive from the intelligent connection system a notification that the second port has reported an internal state change.

9. The host bus adapter of claim 8, wherein the protocol controller is further configured to perform, in response to the notification received from the intelligent connection system, a procedure to determine a current state of the second port.

10. The host bus adapter of claim 9, wherein the protocol controller is further configured to select, on the node containing the second port, another port with which to communicate in response to the protocol controller determining that the state of the second port is one which prevents the second port from communicating with the first port.

11. The host bus adapter of claim 10, wherein the determination that the state of the second port is one which prevents the second port from communicating with the first port, comprises the first port failing to receive within a predetermined period of time an acknowledgement transmitted from the second port indicating the second port successfully received a command previously transmitted to the second port by the first port.

12. A method for advertising port state changes in a network of nodes interconnected through an intelligent connection system, the method comprising:

detecting, by a first port, an interruption in communication with a second port;

transmitting from the first port to the intelligent connection system a notification of a state port change, wherein the notification identifies the second port which has experienced the state change as a source of the notification;

the intelligent connection system determining all other remote ports in communication with the second port and notifying the other remote ports of the state change at the second port, wherein the notifying comprises transmitting from the intelligent connection system to one or more relevant ports on the network, a notification that the second port has an internal state change;

determining a current state of the second port by at least one of the one or more relevant ports receiving the notification from the intelligent connection system; and selecting by each of the one more relevant ports a third port on the node containing the second port with which to communicate upon a determination by each of the one or more relevant ports that the current state of the second port renders the second port inoperable.

13. The method of claim 12, further comprising:
advertising port state changes in the network of nodes interconnected through a Fibre Channel fabric controller in the network implementing Fibre Channel Standard protocols.

14. The method of claim 12, wherein the network is a storage network, and wherein detecting the interruption in communication comprises:
transmitting a command from the first port to the second port to initiate a data exchange; and
failing to receive within a predetermined time an acknowledgement from the second port indicating the second port successfully received the data exchange command transmitted by the first port.

15. The method of claim 14, wherein detecting the interruption in communication further comprises:
performing a procedure by the first port to determine the cause of the failure to receive the acknowledgement.

16. The method of claim 12, further comprising:
advertising port state changes in the network of nodes interconnected through the intelligent connection system comprising at least one from a group consisting of:
a Fibre Channel fabric controller of a network implementing Fibre Channel Standard-compliant protocols;
an iSCSI-compatible switch of a network implementing iSCSI-compliant protocols; and
an InfiniBand fabric controller of a network implementing InfiniBand-compliant protocols.

17. The method of claim 12, wherein transmitting from the first port to the intelligent connection system the notification of the state port change comprises:
transmitting from the first port to the intelligent connection system the notification of the state port change in a manner that does not require modification to protocols implemented in the network.

18. The method of claim 12, wherein the network is a Fibre Channel network, and further wherein transmitting the notification from the first port to the intelligent connection system comprises:
transmitting a Fibre Channel Request State Change Notification data packet comprising a port identifier field having a value identifying the source of the data packet as the second port, and an event field having a value identifying an internal state change that has occurred in the identified port.

19. The method of claim 12, further comprising:
canceling any previously-sent commands that were not processed by the second port; and
transmitting to the third port commands that were sent to the second port and which were not processed by the second port.

20. A method for advertising port state changes in a network of nodes interconnected through an intelligent connection system, the method comprising:
detecting, by a first port, an interruption in communication with a second port;
transmitting from the first port to the intelligent connection system a notification of a state port change, wherein the notification identifies the second port which has experienced the state change as a source of the notification;
the intelligent connection system determining all other remote ports in communication with the second port and notifying the other remote ports of the state port change at the second port, wherein the notifying comprises transmitting from the intelligent connection system to one or more relevant ports on the network, a notification that the second port has an internal state change;
determining a current state of the second port by at least one of the one or more relevant ports receiving the notification from the intelligent connection system;
transmitting a first test command from the first port to the second port;
failing to receive an acknowledgement to the first test command;
transmitting a second test command from the first port to the second port;
failing to receive an acknowledgement to the second test command; and
performing a sequence to logout the first port from the second port.

21. A non-transitory computer-readable storage medium on which is embedded a program, the program upon execution performing a method advertising port state changes in a network implementing an intelligent connection system, comprising:
detecting, by a first port, an interruption in communication with a second port;
transmitting from the first port to the intelligent connection system a notification of a state change in the second port, wherein the notification identifies the second port as a source of the notification;
causing the intelligent connection system to determine all other remote ports in communication with the second port and to notify the other remote ports of the state port change at the second port, wherein the notifying comprises transmitting from the intelligent connection system to one or more relevant ports on the network a notification that the second port has an internal state change;
determining a current state of the second port by at least one of the one or more relevant ports receiving the notification from the intelligent connection system; and
selecting by each of the one or more relevant ports a third port on the node containing the second port with which to communicate upon a determination by each of the one or more relevant ports that the current state of the second port renders the second port inoperable.

22. The computer-readable storage medium of claim 21, wherein the network is a storage network, and wherein detecting the interruption in communication comprises:
transmitting a command from the first port to the second port to initiate a data exchange; and
failing to receive within a predetermined time an acknowledgement from the second port indicating the second port successfully received the data exchange command transmitted by the first port.

23. The computer-readable storage medium of claim 21, wherein the transmission of the notification from the first port to the intelligent connection system of a port state change is performed so as to not require modification to protocols implemented in the network.

24. A method for advertising port state changes in a network of nodes interconnected through an intelligent connection system comprising:
detecting, by a first port, an interruption in communication with a second port;
transmitting from the first port a notification to the intelligent connection system on behalf of the second port indicating that the second port may have failed;
the intelligent connection system determining all other remote ports in communication with the second port and notifying the other remote ports of a state change at the second port, wherein the notifying comprises transmitting from the intelligent connection system to one or more relevant ports on the network a notification that the second port may have failed;

determining a current state of the second port by at least one of the one or more relevant ports receiving the notification from the intelligent connection system; and selecting by each of the one more relevant ports a third port on the node containing the second port with which to communicate upon a determination by each of the one or more relevant ports that the current state of the second port renders the second port inoperable.

25. The method of claim 24, wherein the notification from the first port to the intelligent connection system identifies the second port as the source of the notification.

26. The method of claim 24, wherein the intelligent connection system comprises a Fibre Channel fabric controller in a network implementing Fibre Standard protocols.

27. The method of claim 24, wherein the network is a storage network, and wherein detecting the interruption communications comprises:

transmitting a command from the first port to the second port to initiate a data exchange; and failing to receive within a predetermined time an acknowledgement from the second port indicating the second port successfully received the data exchange command transmitted by the first port.

28. The method of claim 27, wherein detecting the interruption in communication further comprises:

performing a procedure by the first port to determine the cause of the failed acknowledgement.

29. The method of claim 24 wherein the intelligent connection system comprises at least one from a group consisting of:

a Fibre Channel fabric controller of a network implementing Fibre Channel Standard-compliant protocols;

an iSCSI-compatible switch of a network implementing iSCSI-compliant protocols; and an InfiniBand fabric controller of a network implementing InfiniBand-compliant protocols.

30. The method of claim 24, wherein the transmission of the notification is performed so as to not require modification to protocols implemented in the network.

31. The method of claim 24, wherein the network is a Fibre Channel network, and further wherein transmitting the notification from the first port to the intelligent connection system comprises:

transmitting a Fibre Channel Request State Change Notification data packet comprising a port identifier field having a value identifying the source of the data packet as the second port, and an event field having a value identifying an internal state change that has occurred in the identified port.

* * * * *

UNITED STATES PATENT AND TRADEMARK OFFICE
CERTIFICATE OF CORRECTION

PATENT NO. : 7,839,765 B2  
APPLICATION NO. : 10/957707  
DATED : November 23, 2010  
INVENTOR(S) : Frederick E Knight et al.

Page 1 of 1

It is certified that error appears in the above-identified patent and that said Letters Patent is hereby corrected as shown below:

In column 9, line 46, in Claim 4, delete "InfiniB and" and insert -- InfiniBand --, therefor.

Signed and Sealed this  
Thirty-first Day of May, 2011

David J. Kappos  
*Director of the United States Patent and Trademark Office*